United States Patent
Clemot

(10) Patent No.: US 9,451,760 B2
(45) Date of Patent: *Sep. 27, 2016

(54) FISHING HOOK

(71) Applicant: Eric Clemot, Ottawa (CA)

(72) Inventor: Eric Clemot, Ottawa (CA)

(\*) Notice: Subject to any disclaimer, the term of this patent is extended or adjusted under 35 U.S.C. 154(b) by 0 days.

This patent is subject to a terminal disclaimer.

(21) Appl. No.: 14/631,208

(22) Filed: Feb. 25, 2015

(65) Prior Publication Data

US 2015/0164054 A1 Jun. 18, 2015

Related U.S. Application Data

(63) Continuation of application No. 13/618,206, filed on Sep. 14, 2012, now Pat. No. 8,991,096.

(30) Foreign Application Priority Data

Dec. 21, 2011 (CA) ..................... 2762546

(51) Int. Cl.
 *A01K 91/04* (2006.01)
 *A01K 83/00* (2006.01)

(52) U.S. Cl.
 CPC .............. *A01K 83/00* (2013.01); *A01K 91/04* (2013.01)

(58) Field of Classification Search
 USPC .................. 43/44.83, 43.16, 44.85
 See application file for complete search history.

(56) References Cited

U.S. PATENT DOCUMENTS

| | | | | |
|---|---|---|---|---|
| 953,125 A * | 3/1910 | Desmond | ............... | A01K 91/04 43/44.85 |
| 2,545,326 A * | 3/1951 | Westfall | ............... | A01K 91/18 43/42.74 |
| 2,870,563 A * | 1/1959 | Rose | ............... | A01K 83/06 24/115 N |
| 4,905,403 A * | 3/1990 | Manno | ............... | A01K 85/00 43/43.16 |
| 4,989,360 A * | 2/1991 | Lewis | ............... | A01K 91/053 43/42.49 |
| 5,083,394 A * | 1/1992 | Harwig | ............... | A01K 91/053 43/43.15 |
| 7,617,629 B2 * | 11/2009 | Lizardo | ............... | A01K 83/06 43/43.16 |
| 7,730,661 B2 * | 6/2010 | Gaffney | ............... | A01K 91/04 43/43.1 |
| 8,468,738 B1 * | 6/2013 | Long | ............... | A01K 83/00 43/43.16 |
| 2004/0261312 A1 * | 12/2004 | Ravencroft | ............... | A01K 83/00 43/44.83 |
| 2009/0313878 A1 * | 12/2009 | Taylor | ............... | A01K 83/00 43/44.83 |
| 2013/0133240 A1 * | 5/2013 | Beitzel | ............... | A01K 83/00 43/43.16 |

\* cited by examiner

*Primary Examiner* — Christopher P Ellis
(74) *Attorney, Agent, or Firm* — Gowling WLG (Canada) LLP; Matthew Roy

(57) ABSTRACT

A fishing hook has a head having at least two vertically arranged holes through which a fishing line is inserted. When the fishing line is threaded through both of the vertically disposed holes, the hook is stabilized in a substantially orthogonal posture relative to the fishing line, thus enhancing the likelihood of catching fish, especially with a drop-shot technique. Because the single head is small and compact, it is not exposed when the lure is affixed to the hook, thereby improving the likelihood that fish will be tempted by the lure.

9 Claims, 6 Drawing Sheets

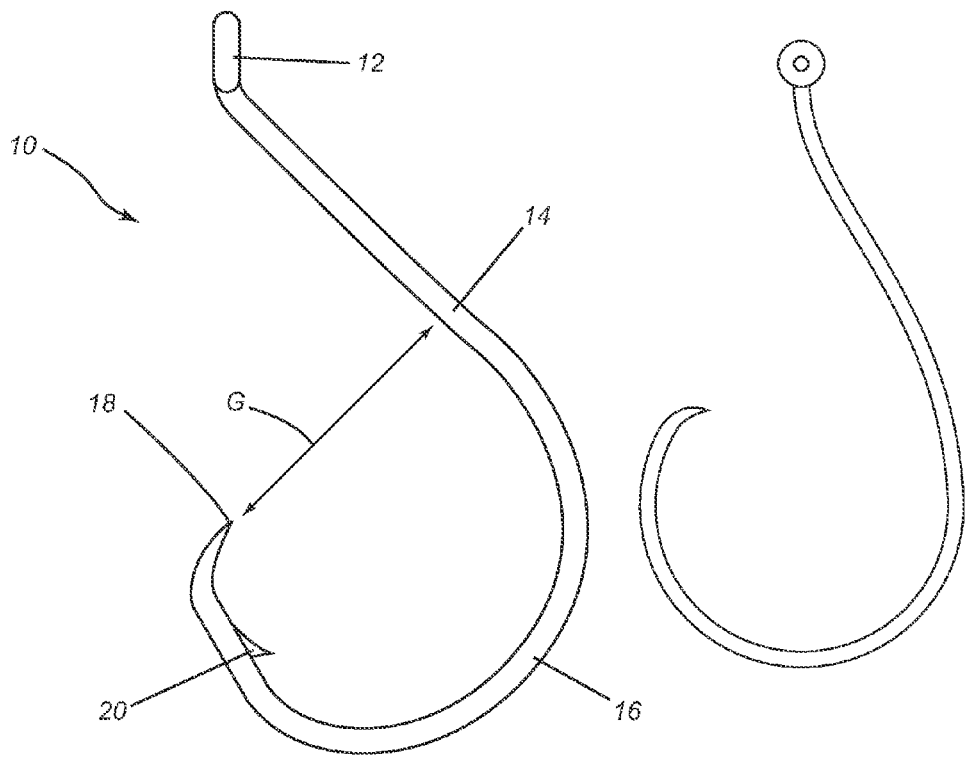
FIG. 1A (Prior Art)  FIG. 1B (Prior Art)
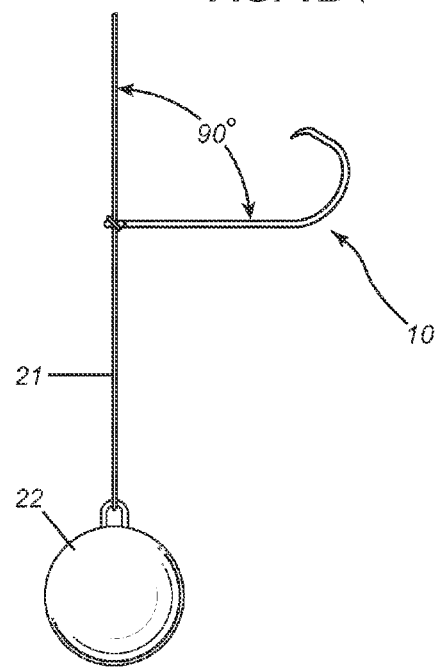
FIG. 2 (Prior Art)

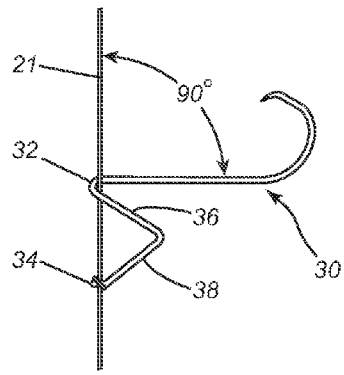
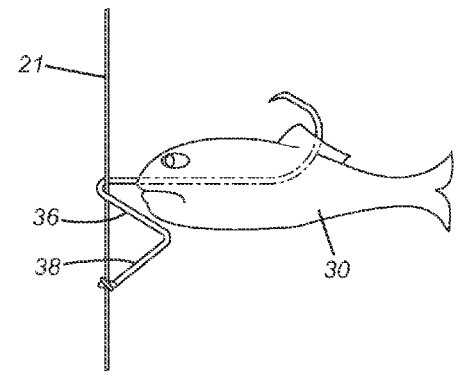
FIG. 3 (Prior Art)   FIG. 4 (Prior Art)
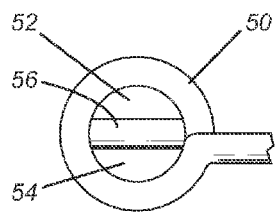
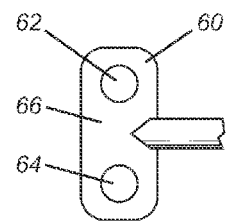
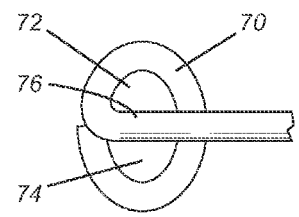
FIG. 5A   FIG. 5B   FIG. 5C
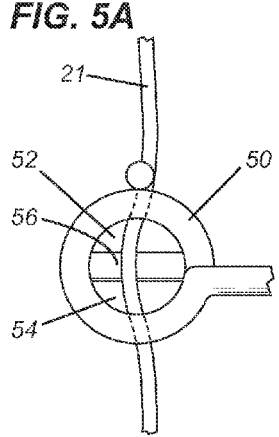
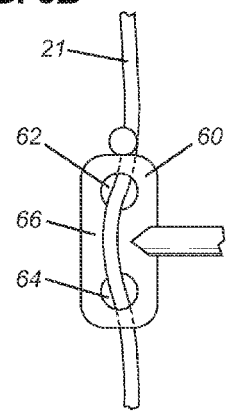
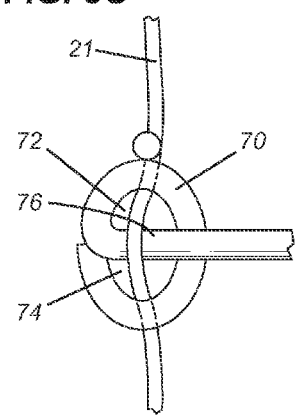
FIG. 6A   FIG. 6B   FIG. 6C

FISHING HOOK

CROSS REFERENCE TO RELATED APPLICATIONS

This application is a continuation of U.S. patent application Ser. No. 13/618,206 which claims priority from Canadian Patent Application No. 2,762,546 filed Dec. 21, 2011.

TECHNICAL FIELD

The present invention relates generally to fishing equipment and, in particular, to fishing hooks.

BACKGROUND

As shown in FIGS. 1A and 1B, a fishing hook, which is generally designated by reference numeral 10, typically has a head 12 with a hole (or eye or eyelet) through which a fishing line is attached. The hook 10 includes a shank 14 extending from the head, a bend 16 extending from the shank that curves and terminates in a point (or tip) 18 such that there is a gap G between the point and the shank. The hook may optionally have one or more barbs 20. Such a design is very well known in the art.

In a drop-shot technique, a lead or tungsten sinker 22 is attached to the end of the line 21. The hook 10 is attached to the line typically 20-60 cm above the sinker. For the drop-shot technique, the hook should ideally be attached in a perpendicular posture relative to the line as shown, for example, in FIG. 2. A lure or bait is then placed on the hook. The drop-shot technique enables the fisherman to maintain contact with the riverbed, or the bottom of the lake or other body of water and thus to ensure that the hook is the desired zone for fishing.

It is also possible to attach multiple hooks to the line at intervals of, for example, 20-30 cm with a heavier sinker or multiple sinkers.

A common problem that arises is that the hook does not remain perpendicular to the line. Traditional hooks do not work well for the drop-shot technique, primarily because they have a head with a single round hole. This is true whether or not the single round head is positioned as depicted in FIG. 1A or transversely as depicted in FIG. 1B. When the traditional hook is attached to a line, the weight of the hook is not sufficiently supported, especially when a lure or bait is affixed, resulting in the hook sagging. The lack of support also makes the hook prone to twirling or becoming snagged in the line. Depending on the type of knot and the size of the bait, the tip of the hook may even sometimes end up pointing in the wrong direction (to the side or downward). Therefore, the traditional hook is unsatisfactory because the hook is thus not in the ideal position for catching a fish. If the hook is not positioned properly, the lure affixed to the hook will also be in the wrong position, with the result that fish will not be tempted to bite.

One effort to address this was the hook of FIG. 3. This hook 30 attaches to the line 21 at two spaced-apart connection points 32, 34. The zigzag support frame has two angled members 36, 38 that extend outwardly from the line as shown in FIG. 3. However, this hook design leaves the angled members 36, 38 fully exposed after the lure 40 or bait is placed on the hook as illustrated in FIG. 4. In other words, as shown in FIG. 4, the lure 40 (when placed fully on the hook) does not envelop or obscure the angled members 36, 38 of the zigzag support frame. The members 36, 38 of the frame are thus visible to the fish. In the drop-shot technique, the fish has time to carefully observe the lure. Fish are much less likely to bite the lure or bait when the frame is exposed in this manner.

Accordingly, a hook that overcomes the foregoing deficiencies would be highly desirable. Such a hook is disclosed in this specification.

SUMMARY

In broad terms, the present invention provides a novel fishing hook comprising a head having at least two vertically aligned holes through which a fishing line is inserted. The line is inserted or threaded through at least two vertically arranged holes in the head and fastened by a suitable knot to the head of the hook. The vertically aligned (or vertically arranged) holes (or eyelets) in the head provide a hook-positioning lever effect when the line is threaded through both of the holes in the head. The hook is thus maintained in a substantially orthogonal posture relative to the line without the presence of a further support frame. The head of the hook may have any number of different shapes, such as round, oval, rectangular, etc, as will be elaborated below.

Accordingly, one aspect of the present invention is a fishing hook comprising a single head having at least two vertically aligned holes for positioning a fishing line. The dual holes of the head position or align the fishing hook such that the shank of the hook is held in a posture that is substantially orthogonal to the line. The hook is attached to the line only by the single head and not by any other element or component. The dual holes of the single head thus provide all of the lever effect necessary to restrain (stabilize) the hook in a substantially orthogonal posture relative to the fishing line.

Another aspect of the present invention is a fishing hook comprising a head, a shank extending from the head, a bend extending from the shank, the bend terminating in a point separated from the shank by a gap, wherein the head has at least two vertically arranged holes for connecting the hook to a fishing line.

Yet another aspect of the present invention is a fishing hook comprising a head that includes a first hole and a second hole, the first hole and the second hole being arranged vertically such that the first hole is above the second hole to thereby create a hook-positioning lever effect when the hook is attached to a fishing line, the lever effect positioning the hook in an orthogonal posture relative to the fishing line when there is a sinker (weight) attached to the line.

BRIEF DESCRIPTION OF THE DRAWINGS

Further features and advantages of the present invention will become apparent from the following detailed description, taken in combination with the appended drawings, in which:

FIG. 1A is a side view of a prior-art fishing hook;
FIG. 1B is a side view of another prior-art fishing hook;
FIG. 2 is a side view of a drop-shot fishing technique as is known in the art;
FIG. 3 is a side view of a recently developed prior-art fishing hook;
FIG. 4 is a side view of a lure connected to the hook of FIG. 3;
FIGS. 5A-5C depict three novel heads having at least two vertically arranged holes in accordance with embodiments of the present invention;

FIGS. 6A-6C illustrate how fishing lines are attached to each of the three novel heads depicted in FIGS. 5A-5C, thereby creating a lever effect that stabilizes the hook in a substantially perpendicular posture relative to the line;

It will be noted that throughout the appended drawings, like features are identified by like reference numerals. It should furthermore be noted that the drawings are not necessarily to scale.

DETAILED DESCRIPTION

Figure 7A:
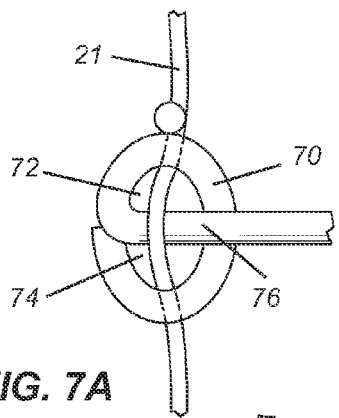
FIGS. 7A-7D are front views of four novel heads for a fishing hook in accordance with embodiments of the present invention.

In general, the present invention provides a novel fishing hook that includes a single head, a shank extending from the head, and a bend extending from the shank, the bend terminating in a point separated from the shank by a gap. The head has at least two vertically arranged holes for connecting the hook to a fishing line. The holes (or eyelets) are vertically aligned or vertically arranged so as to create a hook-positioning lever effect that positions the hook in a posture that is substantially orthogonal to the line. The crossbar that separates the holes may, in other embodiments, be inclined upwardly toward the point of the hook to compensate for the weight of the sinker and lure. In other embodiments, it may be desirable to deviate from the 90-degree posture that is generally considered optimal for the drop-shot technique. Accordingly, in other embodiments, the crossbar may be inclined upwardly toward the point of the hook so as to provide a non-orthogonal posture when the lure and sinker are attached. However, an angle of 90 degrees is generally considered to be the ideal posture for the drop shot. In some embodiments, the two vertically arranged holes may be separated by a crossbar or shank. In some embodiments, the crossbar (or the body of the hook that traverses the head) is horizontal. However, in other embodiments, the crossbar (or the body of the hook that traverses the head) does not need to be perfectly horizontal. Furthermore, in some embodiments, the crossbar is centered to be at the middle of the head such that the holes are symmetrical (i.e. of identical shape and size). However, in other embodiments, the crossbar is not centered along the middle of the head such that the holes are asymmetrical (i.e. the holes may be of different size and shape).

FIG. 5A depicts a first example of a novel head of a fishing hook. The head 50 includes two holes 52, 54 (i.e. two eyes or eyelets) separated by a crossbar 56 (or shank). In this figure (and in others), only the head portion and a top portion of the shank is illustrated (with the understanding that the remainder of the hook) may in general have a standard design and construction with the head extending into a shank that, in turn, curves through a bend to a sharp point. In this example implementation, the head 50 has a generally annular shape (i.e. like a ring), as shown, with a central member (crossbar 56) extending across an internal diameter of the ring. The novel dual hole design of this head stabilizes the hook in a substantially orthogonal posture, making this novel hook well suited for the drop-shot technique.

FIG. 5B depicts another example of a novel head 60 having two vertically arranged holes 62, 64. In this figure, the head may be generally rectangular, oblong or any other polygonal shape that defines the body of the head. Two spaced-apart and vertically disposed holes 62, 64 are provided in the member (body) such that there is a middle portion of the member around which the line is threaded.

FIG. 5C depicts another novel head 70 that may be made by bending a wire into a double loop as shown. The double loop thus defines two holes 72, 74. The twin loops are vertically arranged such that their respective holes are also substantially vertically aligned. The double loop includes a horizontal portion 76 that extends integrally into the shank of the hook. This horizontal portion 76 acts as a crossbar to offset the fishing line relative to the holes 72, 74 to thus create the hook-positioning lever effect.

FIG. 6A depicts how the fishing line 21 is attached or knotted to the head 50. The line 21 is threaded through the two holes 52, 54 and around the crossbar 56. This induces a lever effect that stabilizes the hook in a substantially orthogonal (perpendicular) posture relative to the fishing line. The line may be attached to one of the twin holes of the hook using any suitable knot, e.g. a Palomar knot, Uni knot, etc.

FIG. 6B depicts how the fishing line 21 is attached to the head 60. The line 21 is threaded through the two holes 62, 64 and around the middle portion 66 (that acts like the offsetting crossbar 56 in head 50). This middle portion 66 causes a lever effect that stabilizes the hook in a substantially orthogonal (perpendicular) posture relative to the fishing line.

FIG. 6C depicts how the fishing line 21 is attached to the head 70. The line 21 is threaded through the two holes 72, 74 and around the crossbar 76. This also generates a lever effect that stabilizes the hook in a substantially orthogonal (perpendicular) posture relative to the fishing line.

In operation, as shown in FIGS. 6A-6C, the line is generally taut and bears against the edge (or lip or periphery) of the holes in the head. In other words, the line bears against the body of the head in (FIG. 6B) or against the loops of the head (FIGS. 6A and 6C). The interaction between the line and the head exerts forces on the head that bias the head into the orthogonal posture that is desirable for the drop-shot technique.

Figure 7B:
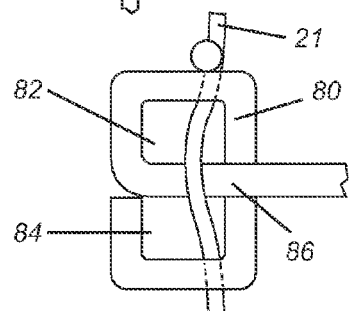
Figure 7C:
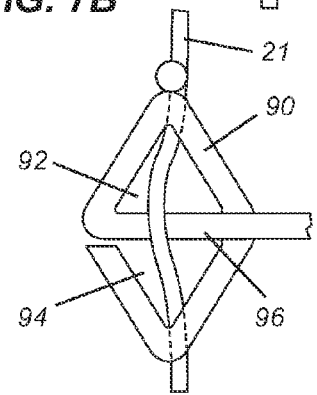
Figure 7D:
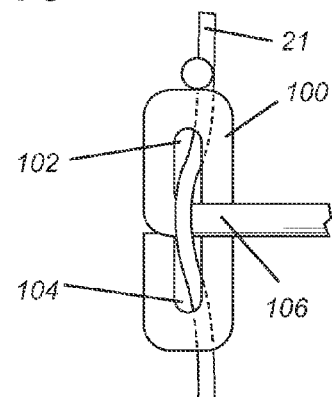
Figure 8A:
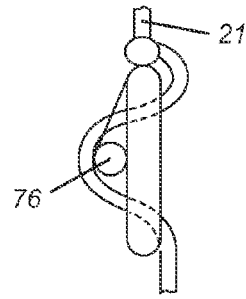
FIGS. 8A-8D are side views of the four novel heads depicted in FIGS. 7A-7D.
Figure 8B:
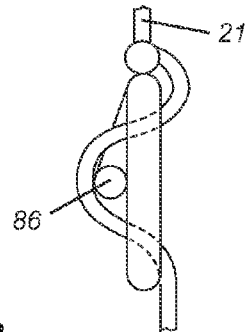
Figure 8C:
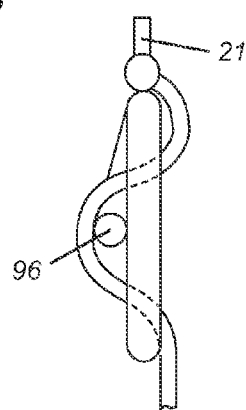
Figure 8D:
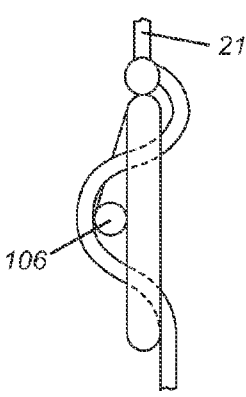
Figure 9A:
FIGS. 9A-9J are views of various types of hooks that may be created by incorporating any one of the novel heads disclosed herein.
Figure 9F:
Figure 9B:
Figure 9G:
Figure 9C:
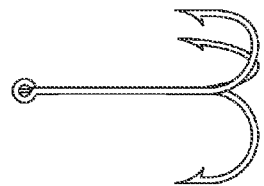
Figure 9H:
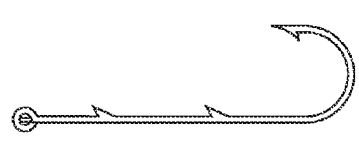
Figure 9D:
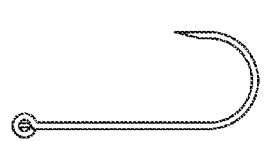
Figure 9I:
Figure 9E:
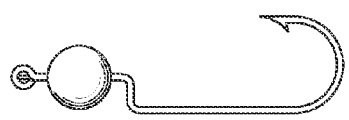
Figure 9J:
Figure 10A:
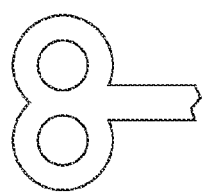
FIGS. 10A-10I depict other novel heads in accordance with other embodiments of the present invention.
Figure 10F:
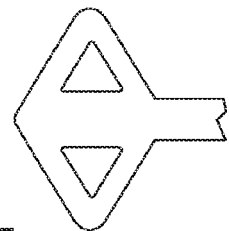
Figure 10B:
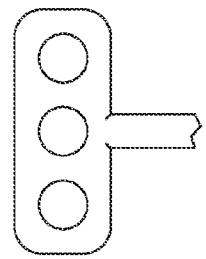
Figure 10G:
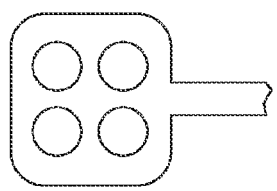
Figure 10C:
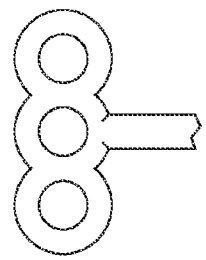
Figure 10H:
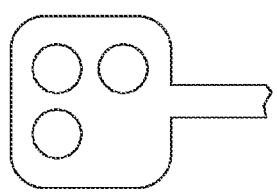
Figure 10D:
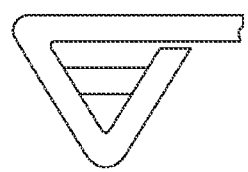
Figure 10I:
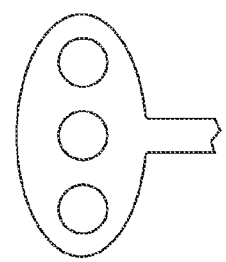
Figure 10E:
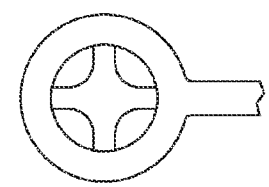

FIGS. 7A-7D are front views of four novel heads for a fishing hook in accordance with embodiments of the present invention. FIGS. 8A-8D are the corresponding side views of the four novel heads depicted in FIGS. 7A-7D. In each pair of illustrations, the offsetting effect of the crossbars 76, 86, 96, 106 may be seen. As illustrated by way of example in these figures, these crossbars are generally horizontal members that augment the lever effect of the line extending through the two holes of the head. In a variant, the crossbar 76, 86, 96 and 106 may be angled/inclined slightly. A slight angle of inclination may be useful to enable the hook to maintain its orthogonal posture when weighted by a sinker and lure. In the embodiments illustrated in these figures, the crossbars are integrally formed with the loops of the head. In the various embodiments shown by way of example in these figures, the loops and crossbar form approximately a figure eight shape with either rounded loops (FIG. 7A) or straight sides with rounded corners (FIGS. 7B-7D) although it should be understood that these are merely presented as some examples of possible implementations. Accordingly, the holes may have different shapes. For example, FIG. 7A shows holes 72, 74 that are generally semicircular. FIG. 7B shows holes 82, 84 that are square or rectangular. FIG. 7C shows holes 92, 94 that are generally triangular. FIG. 7D shows holes 102, 104 that are generally oblong or rectangular. Hooks having these heads can be manufactured using standard metal-working techniques to bend a single length of metal wire into the desired shape. In FIGS. 8A-8D, the sinuous path of the line 21 may be seen. When the line is taut on the hook (and a weight is attached at the end of the line), the line exerts equal and opposite opposing vertical forces on the hook while also exerting equal and opposite horizontal forces on the hook. The equilibrium of these forces maintains the hook in the desired orthogonal posture. When an external force acts on the hook, such as for example a water current, the forces exerted by the line on the hook react to the external force to bias the hook back toward its orthogonal posture. The hook may thus be loaded with a lure and bait without it sagging undesirably, twirling or becoming snagged on the line. This novel fishing hook is thus a radical improvement over all prior-art hooks known to the Applicant.

FIGS. 9A to 9J show ten examples of how the double-eyelet design can be applied to a wide variety of different hooks. It is to be emphasized that these are merely illustrative of some example implementations; this list of examples should therefore not be construed as exhaustive or limiting. In each case, the vertically aligned holes in the head of the hook stabilizes the hook in a posture that is substantially perpendicular to the fishing line. Such a posture is optimal for the drop-shot technique. In the example embodiments presented in FIGS. 9A-9B and 9D-9J, the head of each hook is substantially planar with the shank and bend of the hook. In the example embodiment of FIG. 9C, only the shank (and one of the bends) of the trident hook is planar with the head. These embodiments are merely illustrative examples and should not be construed as limiting. For example, the length of the hook may be varied as well as its form and the curvature of the bend and point. Furthermore, the crossbar (shank) inside the head (e.g. FIGS. 5A and 6A) may be replaced by the body of the hook that traverses the head (e.g. FIGS. 5C and 6C).

FIGS. 10A-10I show nine further examples of different heads having at least two vertically arranged holes. For those heads that include more than two holes, the line must at least be inserted through two vertically arranged holes to create the hook-positioning lever effect that stabilizes the hook in the orthogonal posture relative to the line. In the example embodiments depicted in FIGS. 10A-10I, the heads are substantially planar with the shank and bend of each hook.

Figure 11A:
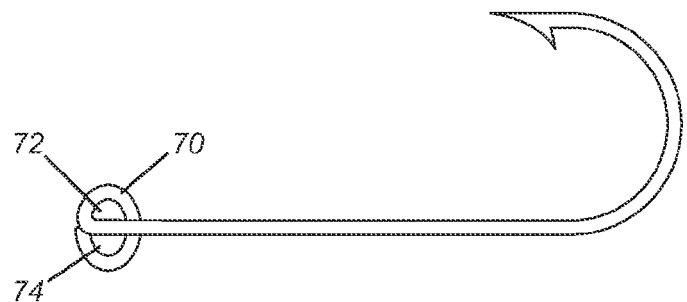
FIG. 11A-11D depict novel hooks in accordance with embodiments of the present invention.
Figure 11B:
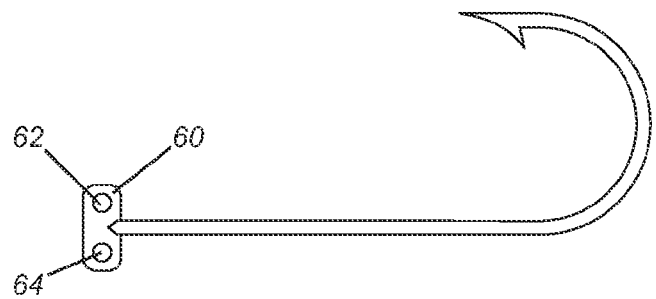
Figure 11C:
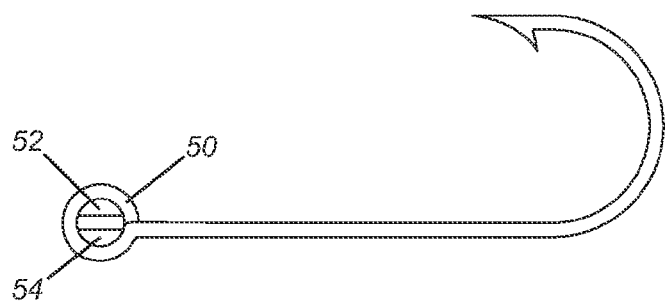
Figure 11D:
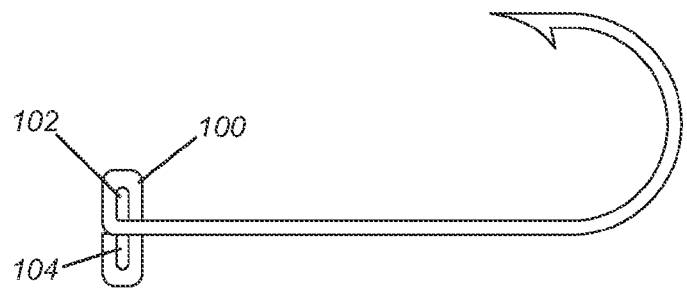

FIGS. 11A-11D illustrate four novel hooks that each includes a head having two vertically aligned holes. FIG. 11A illustrates a hook having the head 70 of FIG. 7A. FIG. 11B illustrates a hook having the head 60 of FIG. 5B. FIG. 11C illustrates a hook having the head of FIG. 5A. FIG. 11D illustrates a hook having the head of FIG. 7D. Although there are various useful implementations of the novel hook, the simple and elegant designs presented in FIG. 11A and FIG. 11C represent the best mode of implementing the invention presently known to Applicant. The illustrated hooks may optionally include one or more barbs. It is important to minimize the size of the head so that the head may be enshrouded and obscured by the lure.

In the embodiments depicted above by way of example, the head is planar with the shank and bend of the hook. In some embodiments, the point (tip) is also planar. In those embodiments, the entire hook (from head to point) is planar. In other embodiments, the point may curve slightly out of plane such that only the shank and bend of the hook are planar with the head. The head of the hook may also be a "circle hook", that is, a hook with a point that curves to the interior instead of being straight or extending to the side.

The fishing hooks disclosed herein are ideally suited for the drop-shot technique but may also be used in other fishing techniques. The head of the hook may also be attached to the end of the line as opposed to a middle section of the line as it would be attached for the drop-shot technique. The same hook may thus be used in many other known fishing techniques. The hook is thus very versatile since it may be used to fish in many different ways.

The fishing hooks disclosed herein may be used for recreational, sport or commercial fishing. The hooks may be used in salt water or fresh water.

The fishing hooks disclosed herein may be used singly (one per line) or multiply (multiple hooks per line).

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims.

The invention claimed is:
1. A fishing hook comprising:
    a single head having at least two vertically aligned holes through which a fishing line is inserted, the holes positioning the fishing hook orthogonally relative to the fishing line, wherein the head comprises a crossbar that is offset relative to the loops to create a hook-positioning lever effect such that the hook is positioned substantially orthogonally relative to the line when the line is attached to the hook through both holes in the head.
2. The fishing hook as claimed in claim 1 wherein the head comprises two loops defining the holes, the loops being substantially vertically aligned.
3. The fishing hook as claimed in claim 1 wherein the head is planar with a shank and a bend of the hook.
4. A fishing hook comprising:
    a head;
    a shank extending from the head;
    a bend extending from the shank, the bend terminating in a point separated from the shank by a gap;
    wherein the head has at least two vertically arranged holes through which a fishing line is inserted, wherein the head comprises a crossbar that is offset relative to the loops to create a hook-positioning lever effect such that the hook is positioned substantially orthogonally relative to the line when the line is attached to the hook through both holes in the head.
5. The fishing hook as claimed in claim 4 wherein the holes are defined by two loops of the head that are substantially vertically aligned.
6. The fishing hook as claimed in claim 4 wherein the head is planar with the shank and the bend of the hook.
7. A fishing hook comprising:
    a head that includes a first hole and a second hole, the first hole and the second hole being arranged vertically such that the first hole is above the second hole to thereby create a hook-positioning lever effect when the hook is attached to a fishing line through both the first hole and the second hole, the lever effect positioning the hook in an orthogonal posture relative to the fishing line when the line is attached to a weight, wherein the head comprises a crossbar horizontally offset relative to the head around which the line is placed to generate the hook-positioning lever effect.

8. The fishing hook as claimed in claim 7 wherein the head is formed from a single length of metal wire.

9. The fishing hook as claimed in claim 7 wherein the head is planar with a shank and a bend of the hook.

* * * * *